Patented Feb. 16, 1937

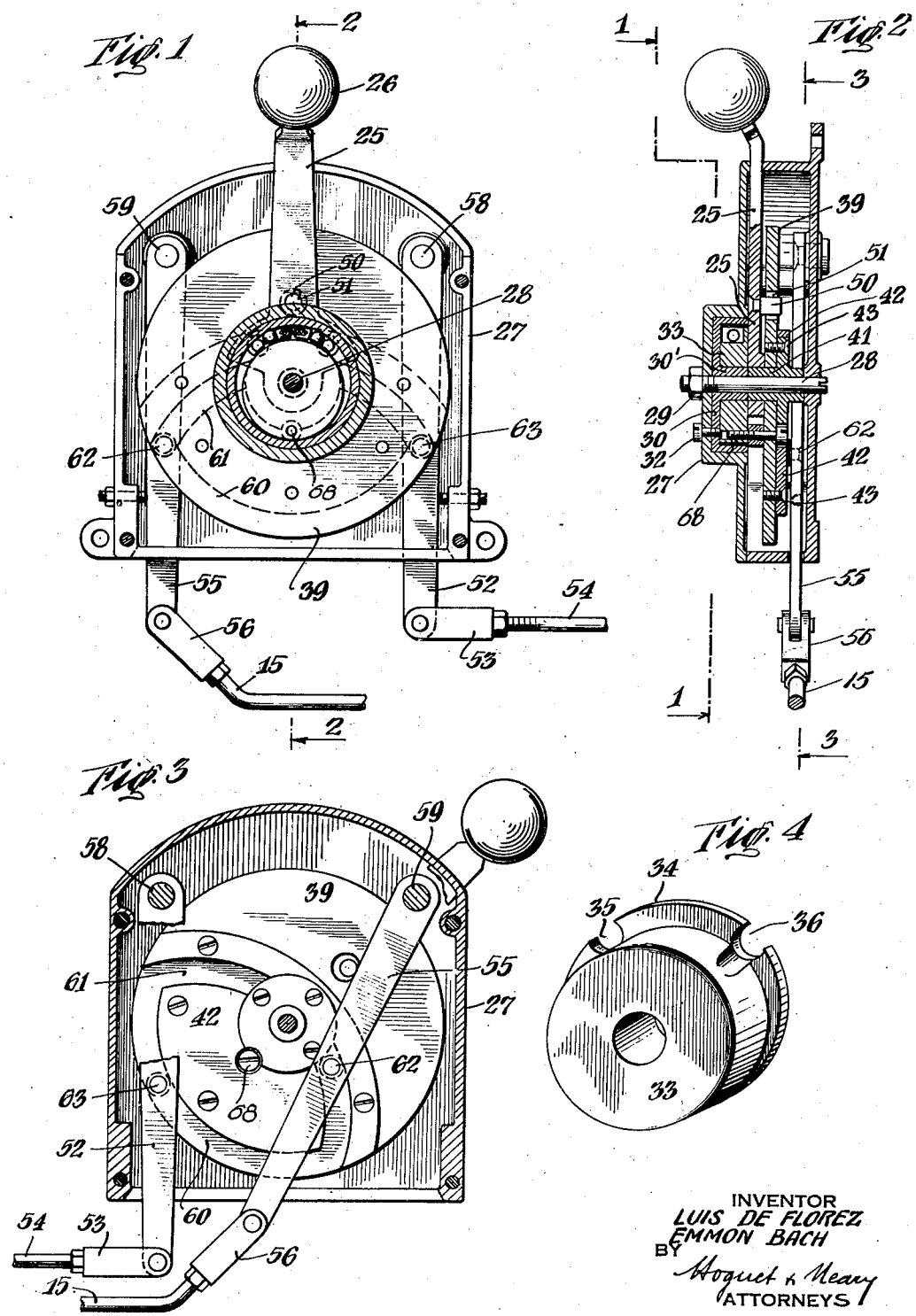

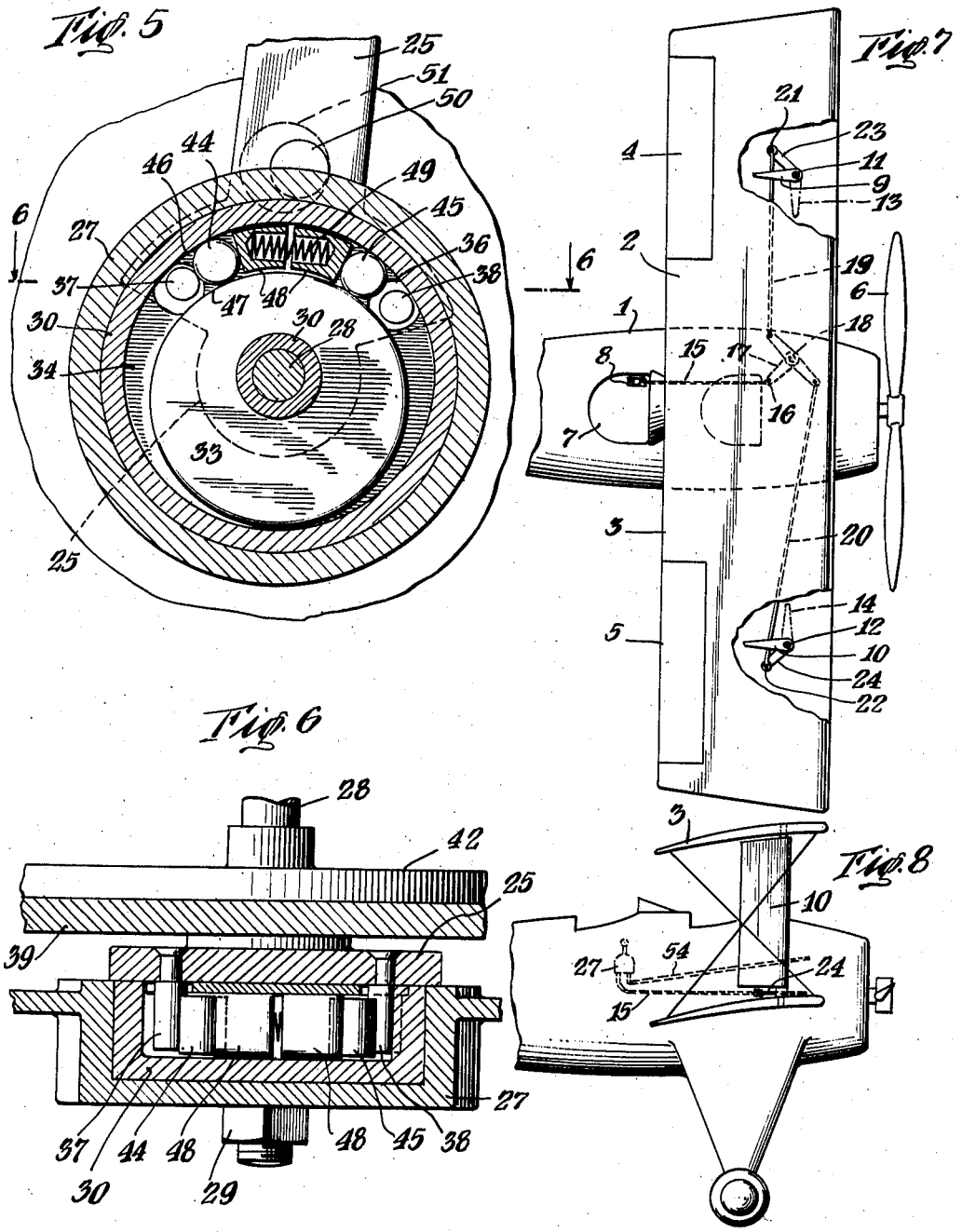

2,071,063

UNITED STATES PATENT OFFICE 2,071,063

COMBINED THROTTLE AND BRAKE CONTROL FOR AIRPLANES

Luis de Florez, Pomfret, Conn., and Emmon Bach, New York, N. Y.; said Bach assignor to said De Florez Application November 22, 1933, Serial No. 699,124

9 Claims. (Cl. 192—3)

This invention relates in general to airplane control devices and more particularly to a control device for regulating the application of air brakes and engine throttle.

It has been conventional practice in airplanes employing air brakes to have a control lever for operating air brakes and another entirely independent lever for controlling the engine throttle. These air brakes or spoilers are merely surfaces which can be turned into the airstream and used to retard the speed of flight of the airplane. If they are set to retard the airplane and for some reason or other the pilot has misjudged the angle of his glide in his attempt to land the airplane, the spoilers should be released before opening the throttle in order to correct the situation. However, it oft times occurs that since the brake lever is set and both the throttle and brake lever have to be moved about the same time, in the case of an emergency the pilot is reluctant to use the brakes near the ground where they would be most effective and likely to be used, in view of the fact that the pilot also needs to control the joystick or wheel in making the landing.

A survey of the situation apprises us of the fact that in view of the above circumstances pilots very seldom, if ever, use the air brakes, but on the contrary resort to side slipping or fish tailing when they are coming in to land, which maneuver may be perfectly satisfactory on certain airplanes but in the case of airplanes provided with a round fuselage, slipping has been found to be very ineffective and air brakes if used would be very desirable throughout the entire glide to the ground. Thus, not only are the present air brakes rendered practically useless by the common practice of the pilot, but in some cases the pilot resorts to unsafe practices in landing when he does not make use of the air brakes.

It is therefore an object of this invention to provide a suitable foolproof, single unit control device which not only must the pilot use for the combined control of the air brakes and the engine throttle but which will be the most handy and convenient control device, which will be attractive to the pilot, in that he will be free to operate the control stick or wheel and further in that his mind will not be burdened with complicated control devices, either in an emergency or in the usual landing operation.

By combining the throttle lever and air brake lever we propose to so arrange the device that when it is in a neutral position, the airplane will be in a normal glide, the motor throttled down and the brakes not applied. Thus, with one hand on the control lever, the pilot may use the motor to correct for under shooting, or apply the air brakes to decelerate the speed of the airplane and shorten the glide. The combination, therefore, of the operation of opening the throttle and applying the air brakes in a forward or backward movement of the hand, as we propose to do, will add to the control of the ship in landing, by permitting variations in speed to below the closed throttle position while the airplane is maintained in a substantially normal landing glide and its axis maintained parallel to the line of flight. This will make it possible for the pilot to approach a landing and extend or reduce the glide of his airplane as he approaches the landing by the motion of one hand which is normally held on the throttle in any event and the full effect of the air brakes may be applied to reduce floating characteristics a few feet off of the ground and still permit the hands and feet of the pilot to remain in their normal positions.

The invention consists in the combination of parts and in the details of construction, hereinafter set forth in the following specification and appended claims, certain embodiments thereof being illustrated in the accompanying drawings, in which:

Figure 1 is a view in front elevation of the control unit partly in section taken along line 1—1 of Fig. 2;

Figure 2 is a view in section taken along line 2—2 of Figure 1;

Figure 3 is a view in section taken along line 3—3 of Figure 2 but so drawn as to show the various parts of the mechanism in brake applied position;

Figure 4 is an enlarged detailed view in perspective of the control spool;

Figure 5 is an enlarged view in detail of the lever locking mechanism;

Figure 6 is a view in section taken along line 6—6 of Figure 5;

Figure 7 is a partial plan view of an airplane, partly in section showing the air brakes in inoperative position and the control levers therefor in dotted lines, and the air brakes also shown in fully extended position in dotted lines;

Figure 8 is a side view of a portion of the airplane showing the air brakes and means for operating the same, the latter being shown in dotted lines.

Referring more particularly to the drawings, the airplane is shown in Figures 7 and 8 as having the ordinary fuselage 1 with wings 2 and 3 and ailerons 4 and 5. The airplane is shown as being the tractor type, employing a suitable engine and the tractor propeller 6. The engine is not shown in the drawings as it may be of any suitable type. The airplane is also shown as having a pair of cockpits, one of which is indicated at 7.

For the purpose of convenience, the description will deal with a control device indicated at 8 and being arranged within the rear cockpit 7, although it is to be understood that in the event that more than one cockpit are used, a dual control system may be readily installed. The two air brakes are shown at 9 and 10 as pivotally movable around their respective points 11 and 12 so as to assume inoperative position, as shown in full lines in Figure 7, or fully operative position as respectively shown at 13 and 14 in dotted lines, in which latter positions they are adapted to effect a maximum resistance to retard a forward speed of the airplane. Generally speaking the means for controlling the application of these brakes consists in a rod 15 connected to the control unit 8, the rod extending forward so as to be pivotally connected at 16 to a three-pronged lever 17 pivoted to the airplane at 18. To this lever 17 are connected two rods 19 and 20, which in turn are pivotally connected respectively at 21 and 22 to arms 23 and 24 for moving the air brakes 9 and 10 about their pivot points 11 and 12 respectively.

In order to provide a single unit control with the operation of the air brakes and the throttle, there is provided a single manually operable lever 25 and a hand knob 26, which is shown in Figure 1 as being in neutral position, in which position the air brakes will be in inoperative position and the throttle closed. By means about to be described, a forward movement of the lever will bring about an increased engine speed while in no way effecting the inoperative position of the air brakes. Conversely, a movement of the lever rearwardly or to the left, as shown in Figure 1, will in no wise effect the fully closed position of the throttle, but will move the air brakes into an operative position, the effect of which may be controlled by the extent of movement of the lever in this direction.

To bring this about, there may be arranged a housing 27, which may be suitably secured in any manner, preferably to the side of the fuselage adjacent the pilot, for convenient operation of the lever. This housing 27 is provided with a pin 28 extending therethrough and secured to the casing by means of the nut 29. Interiorly arranged of the housing 27 is a casing 30 secured thereto by a screw 32 to receive a spool 33 rotatably and eccentrically mounted on a sleeve portion 30' of the casing 30. This spool is provided with a circular flange 34 which is notched at 35 and 36 to receive pins 37 and 38 carried by lever 25 the latter being mounted on the pin 28. Arranged behind the large disc 39 is a guide plate 42, which is secured by screws 43 to disc 39 and which has an integral collar 41 so as to be rotatably carried by pin 28. The spool 33 is coupled to the disc 39 by a bolt 68. The control lever 25 has its lower portion rotatably mounted on the collar or hub 41.

Referring to Figure 5, rollers 44 and 45 are positioned between the spool and the casing 30 so that they are held in engagement with the interior surface 46 on the inside of the casing 30 and the exterior surface 47 of the eccentric spool by means of a pair of split blocks 48 between which is arranged a compression spring 49 acting to push the rollers in opposite directions. This arrangement provides for an effective lock for the spool against movement in either direction in that such movement is prevented by rollers 44 and 45.

Also carried by the lever 25 is a pin 50 which extends into an enlarged slot or aperture 51 in disc 39. This allows for a limited relative movement of lever 25 without imparting rotation to disc 39. Thus as an initial movement of the lever in a clockwise direction, see Figures 1 and 5, is made, roller 44 is relieved of its binding engagement with surfaces 46 and 47, by means of pin 37. A further movement of the hand lever in a clockwise direction brings pin 50 into contact with the right hand extremity of the slot or aperture 51 so as to bring about a consequent rotation of disc 39 and the cam plate 42 carried thereby, the lock being thus ineffective as the roller 45 continues to overrun during this movement. The converse locking action takes place upon a movement of the hand lever in a counterclockwise direction with respect to the rollers 44 and 45, the latter being urged out of locking position by pin 38 while roller 44 overruns the spool upon further rotation in that direction.

The throttle operating mechanism includes a link 52 pivotally connected at 58 to the casing. To this link another one 53 may be pivotally connected, which adjustably receives an operating rod 54 extending to the engine. The brake operating mechanism may include a link 55 pivotally connected at 59 to the casing. To this link is connected another one 56 which adjustably receives the rod 15.

The cam plate 42 is provided with a groove or track which is continuous, as shown in Figures 1 and 3, and which has a concentric portion 60 and an eccentric portion 61. Links 52 and 55 have respectively carried thereby pins 63 and 62 which ride in the cam slot. When the hand lever is in neutral position, as shown in Figure 1, pins 62 and 63 are both within the concentric portion 60 of the cam slot. When, however, the hand lever is pulled back, or counterclockwise with respect to the showing in Figure 1, the pin 63 riding in the concentric portion 60 of the cam slot imparts no movement to the throttle links 52. However, as shown in Figure 3, pin 62 is thus forced into the eccentric portion 61 of the cam slot, which causes a movement of link 55 about its pivot 59 so as to push the air brake operating rod 15 forwardly with respect to Figure 7, so as to apply the brakes. A movement of the hand lever clockwise from the position shown in Figure 1, brings pin 63 into the eccentric portion 61 of the cam slot, while pin 62 remains in the concentric portion. This brings about the operation of the throttle independently of the air brakes.

Thus, looking at Figure 1, all of the movements of the hand lever from the neutral position shown in a forward or clockwise direction and return to neutral effect only a control of the throttle while maintaining the air brakes locked in inoperative or neutral position. Likewise, all of the movements of the hand lever from the neutral position shown in a rearward or counterclockwise direction and return to neutral effect only a control of the air brakes while maintaining the throttle control locked so that the engine will be fully throttled to a predeterminable degree.

Moreover the locking mechanism described in connection with Figures 1 and 5 is automatic in its operation to lock the operating levers 52 and in any one of their adjusted positions, whether it be in a forward or rearward position, with respect to the neutral one shown in Figure 1. This locking means is effective against accidental displacement, by reason of vibration within the airplane or from any other cause. In order to release the locking device, the hand lever must be positively operated, so as to release the locking mechanism to make possible a movement or adjustment of the hand lever in a forward or rearward direction.

It will thus be seen by reason of the above described device, such a combination of throttle and air brake control, as provided for, in all probability will result in a new and simpler technique of landing of an airplane where it might be brought in on an even keel, probably somewhat faster than usual for security and the speed killed a few feet off the ground, without the necessity of side slipping or fish tailing.

With the conventional system the necessity of keeping the ship level at the last moment and of landing it by use of the elevator and the desirability of maintaining one hand on the throttle in case of an emergency, does not give the required freedom for handling air brakes and therefore the air brakes are seldom used in this condition. They are usually set some distance in the air and the airplane landed with them fully on or else they are not used at all.

The use of the present invention makes the use of air brake control throughout the entire landing a control which will be not only attractive to the pilot but will make such control virtually instinctive in its nature. In other words, the use of the throttle is instinctive to correct a glide when the airplane is about to land short of the desired amount. Moreover, it will be equally instinctive to correct over shooting in the reverse manner.

One of the more important features of the control lies in its inherent simplicity and the fact that correction may be made at any time without endangering the safety of the airplane by killing the speed with side slipping or fish tailing. This would become more and more important as airplanes are more refined in their design, so as to offer less resistance to the air. In some airplanes which are highly streamlined, the only effective way of slowing them down is to pull up the nose to an angle of inclination closely approximating a stalling position and hold the airplane in this position while the airplane is allowed to settle down to a landing. This, of course, is oft times hazardous, particularly on a gusty day or one where air currents are erratic near the surface of the ground due to heat radiation.

While the operating and locking mechanism has been described as being particularly suitable for use as a combined control for air brakes and engine throttle control, it will be appreciated that its field of use is not limited thereto and that it is perfectly adaptable for use for effecting other combination controls.

We claim:

1. In combination in an engine propelled aircraft having control surfaces operable together to act as air braking devices while said aircraft is in flight, means for controlling the operation of the throttle of said engine and the operation of said braking devices, a single hand operated member for controlling said throttling means and braking devices, and means for insuring against operation of said throttling means while operating said braking devices and vice versa.

2. In combination in an engine propelled aircraft having control surfaces operable together to act as air braking devices while said aircraft is in flight, means for controlling the operation of the throttle of said engine and the operation of said braking devices, a single hand operated member for controlling said throttling means and braking devices, said hand operated member having a neutral position at which the engine will be substantially throttled at idling speed and said braking devices in ineffective positions, means operated by the movement of said hand operated member in one direction for adjusting said throttling means while insuring against operation of said braking devices, and means operated by the movement in an opposite direction past said neutral position only for adjusting said braking devices into effective positions while insuring against operation of said throttling means.

3. In combination a pair of operating devices, a single control means therefor including means connecting said control means with both of said operating devices for controlling and operating one device while locking the other against possible movement and vice versa, said control means comprising a cam plate operatively connected to said operating devices, a hand lever operatively connected to said cam plate, a self-locking and unlocking clutch and means carried by said hand lever for operating said clutch.

4. In combination a pair of operating devices, a single control means therefor including means connecting said control means with both of said operating devices for controlling and operating one device while locking the other against possible movement and vice versa, and means for automatically locking said devices in any of the adjusted positions brought about by an operation of said control means, said control means comprising a cam plate operatively connected to said operating devices, a hand lever operatively connected to said cam plate, a self-locking and unlocking clutch and means carried by said hand lever for operating said clutch.

5. In combination a pair of operating devices, a single control means therefor including means connecting said control means with both of said operating devices for controlling and operating one device while locking the other against possible movement and vice versa, said control means comprising an operating means connected to said operating devices, a hand control element operatively connected to said operating means, a self-locking and unlocking clutch and means carried by said hand control element for operating said clutch.

6. In combination a pair of operating devices, a single control means therefor including means connecting said control means with both of said operating devices for controlling and operating one device while locking the other against possible movement and vice versa, and means for automatically locking said devices in any of the adjusted positions brought about by an operation of said control means, said control means comprising an operating means connected to said operating devices, a hand control element operatively connected to said operating means, a self-locking and unlocking clutch and means carried by said hand control element for operating said clutch.

7. In combination in an engine propelled aircraft having control surfaces operable together to act as air braking devices, means for controlling the operation of the throttle of said engine and the operation of said braking devices, said means comprising a hand lever connecting said control means with both said braking devices and said throttle for controlling and operating the braking device while locking the throttle against possible movement and vice versa, said control means comprising an operating means connected to said braking device and throttle operating devices, said hand control element being operatively connected to said operating means, a self-locking and unlocking clutch and means carried by said hand control element for operating said clutch.

8. In combination in an engine propelled aircraft having control surfaces operable together to act as air braking devices while said aircraft is in flight, means for controlling the operation of the throttle of said engine and the operation of said braking devices, a single hand operated member for controlling said throttling means and braking devices, said hand operated member having a neutral position at which the engine will be substantially throttled at idling speed and said braking devices in ineffective positions, means operated by the movement of said hand operated member in one direction for opening said throttle and for closing said throttle when said member is moved back to said neutral position and also for applying said air brakes while leaving said throttle closed as said movement of said member is continued past said neutral position.

9. In combination in an engine propelled aircraft having control surfaces operable together to act as air braking devices while said aircraft is in flight, means for controlling the operation of the throttle of said engine and the operation of said braking devices, a single hand operated member for controlling said throttling means and braking devices, said hand operated member having a neutral position at which the engine will be substantially throttled at idling speed and said braking devices in ineffective positions, means operated by the movement of said hand operated member in one direction for opening said throttle and for closing said throttle when said member is moved back to said neutral position and also for applying said air brakes while leaving said throttle closed as said movement of said member is continued past said neutral position, for the purpose of controlling the elevating force of engine speed and the opposing force of the air brakes.

LUIS DE FLOREZ.
EMMON BACH.